3,189,309
REAR VIEW MIRRORS FOR VEHICLES
Albert P. Hager, Minneapolis, Minn., assignor to Re-Trac Manufacturing Corp., Minneapolis, Minn., a corporation of Minnesota
Filed July 12, 1963, Ser. No. 294,487
4 Claims. (Cl. 248—279)

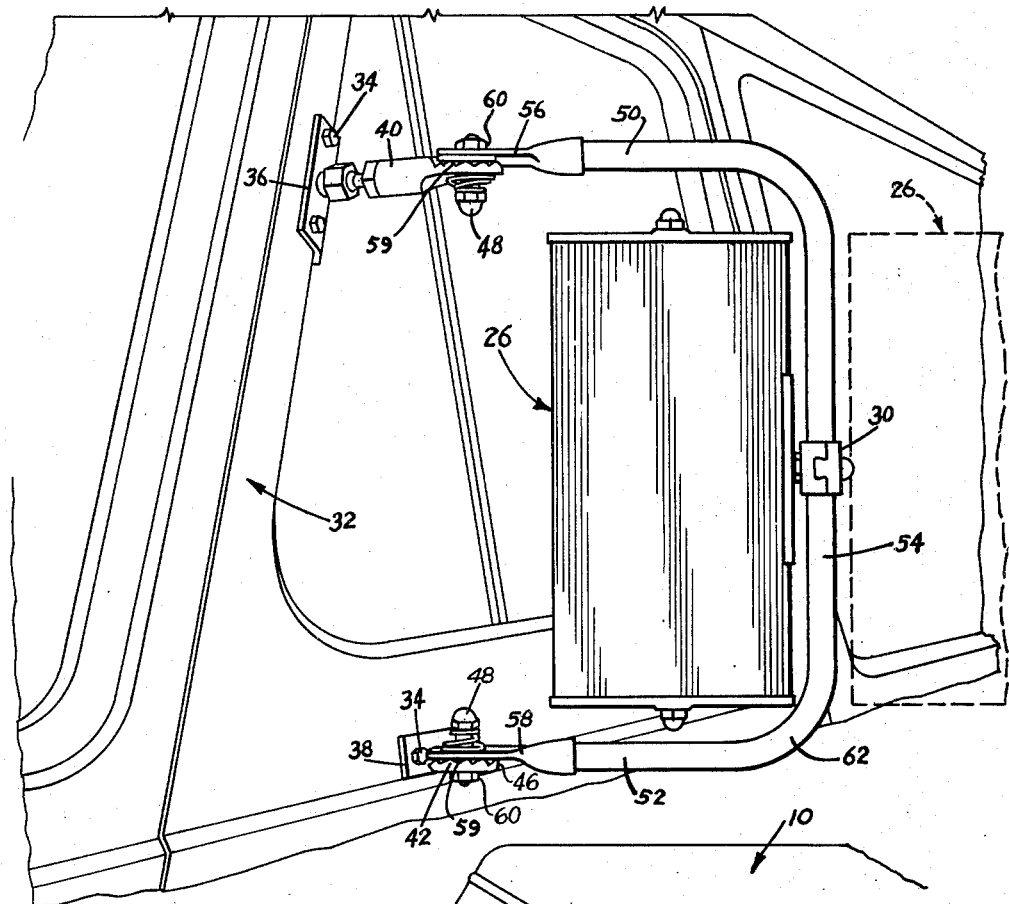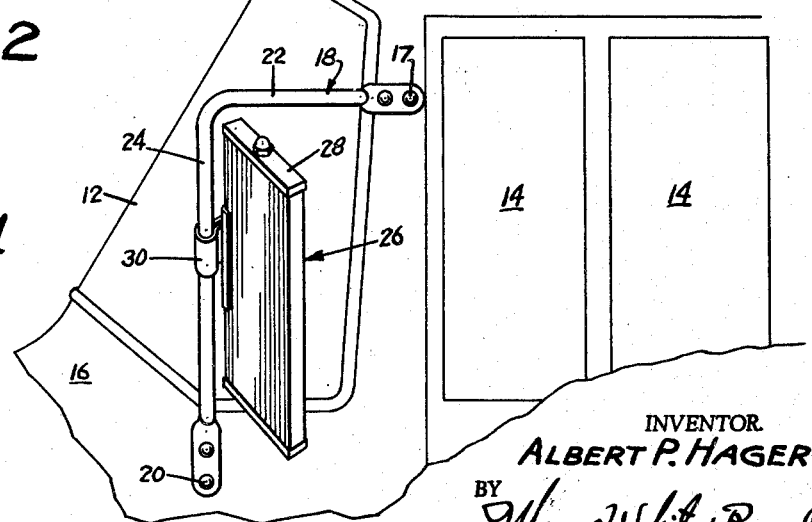

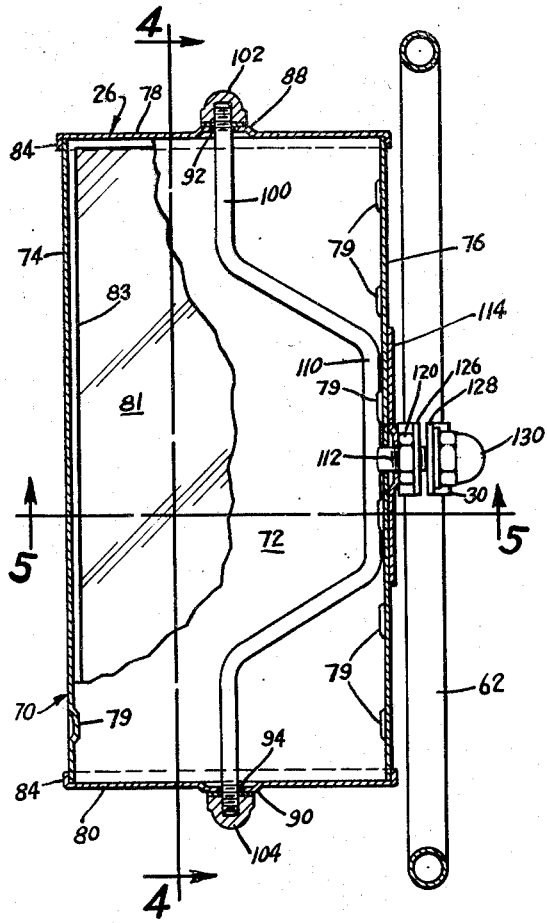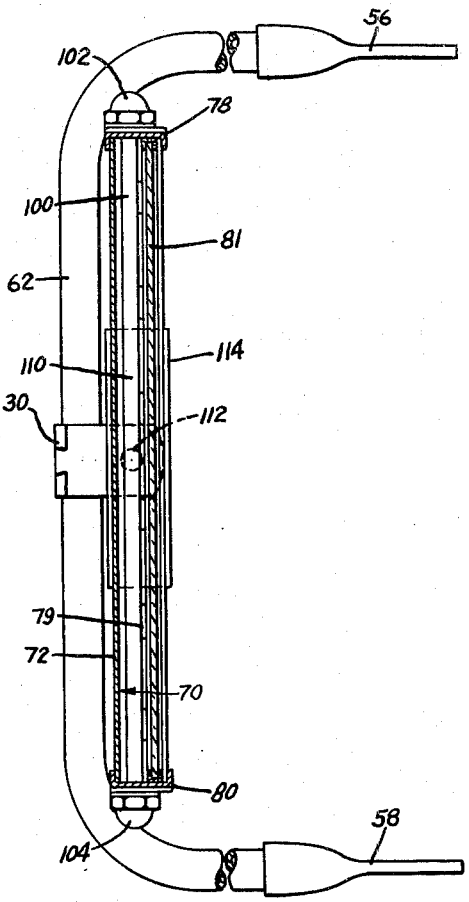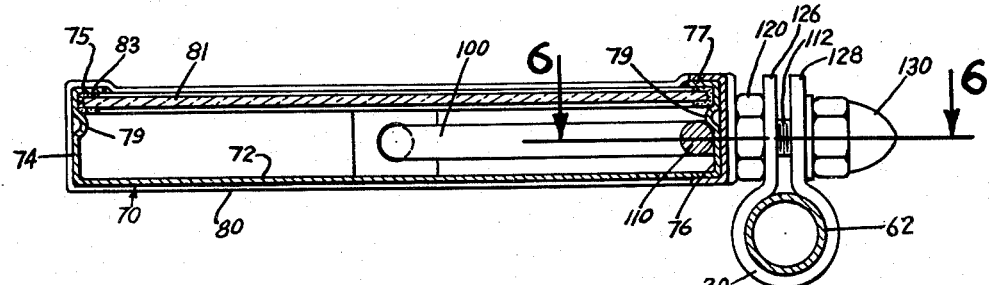

The present invention relates to the construction of rear view mirrors for vehicles such as trucks and more particularly to an improved mounting assembly for such mirrors.

A variety of rear view mirrors have been previously proposed for use on motor vehicles such as trucks. Many of these prior mirrors have been relatively expensive to construct and have not furnished satisfactory ease of adjustment or durability.

To provide the required visual field, a modern truck mirror must be fairly large in size and must also have a relatively great height as compared, for example, with the rear view mirrors of a passenger vehicle. For these reasons, rectangular mirrors having dimensions on the order of 14 x 16 inches have come into common use on trucks. Due to their relatively large size and weight, such mirrors have customarily been supported at both the top and bottom. Each of these supports comprises a pivot which allows movement about a vertical axis. Frequently, the pivots are positioned somewhat behind the center of the mirror.

One of the disadvantages of this type of mirror is that the casing is subject to damage from vibration or shock. Thus, vibration sometimes causes metal fatigue which can result in breakage of the mirror supporting parts. Another important disadvantage of this mounting system is that there is no way to rapidly and conveniently tilt the mirror about a horizontal axis to bring the desired image into view. A still further disadvantage is that the mirror cannot be extended laterally a substantial distance.

In view of these and other defects of the prior art it is thus one object of the present invention to provide an improved rear view miror for vehicles such as trucks which is light in weight, rugged in construction and will reliably withstand exposure to vibration over an extended period of time.

It is yet another object of the present invention to provide an improved rear view truck mirror which is supported upon a horizontally disposed pivot positioned at its approximate center whereby the mirror can be easily tilted about a horizontal axis as required to adjust the vertical position of the image.

Yet another object of the present invention is the provision of an improved rear view mirror for vehicles which can be easily moved to a retracted position relatively close to the vehicle body or extended outwardly as required.

Another object of the present invention is the provision of a mirror for a truck including a means which enables the mirror to be moved to selected positions upon a vertical axis.

Yet another object of the present invention is the provision of an improved rear view mirror including a mirror casing and reinforcing member therein to exert tension upon the side walls of the casing and thus provide internal support for the mirror casing so that damage due to vibration is reduced.

Briefly stated, one preferred embodiment of the present invention includes a reflecting member or mirror glass mounted upon a generally rectangular casing. End members such as caps are provided on the casing and a reinforcing member is mounted within the casing and connected between the end members. The reinforcing member is connected to a first pivot for allowing the mirror to be tilted about a horizontal axis. The first is in turn connected to a second pivot which allows the mirror to be pivoted about a vertical axis. The reinforcing member preferably comprises an elongated rod which extends between the end caps and is displaced to one side of the casing at its center. The first and second pivots are positioned along one side of the casing at a point approximately intermediate the top and the bottom of the mirror. The second pivot is mounted upon a suitable support member such as a vertically disposed metal tube which is itself attached to the vehicle.

The present invention thus provides a mirror with a single side mounting point which nevertheless is not easily damaged by vibration. Moreover, the mirror is economical to produce and can be used in a variety of applications. By mounting the mirror upon the support tube or loop at a single point for pivotal movement about vertical as well as horizontal axes, the mirror head can be pivoted from a first position between the support loop and the wall of the vehicle to a second position on the opposite side of the support loop from the vehicle. This feature of my invention is particularly advantageous since it is frequently desirable to extend the mirror a substantial distance laterally. The present invention also permits more convenient tilt adjustment than was heretofore possible in large truck mirrors. At the same time, the mirror can be quickly and easily elevated or lowered upon the mirror support in order to accommodate for the differences in the dimensions of the vehicle or for the size of the driver and only one fastener is required to secure the mirror against movement in three directions.

In accordance with the present invention, the mirror is positioned between a support member and the vehicle for normal operation. When a large trailer or one which is larger than usual is attached to the vehicle, the mirror body can be pivoted around to the outside of the loop and then inverted by causing it to be pivoted about a horizontal axis so that the glass faces rearwardly.

Since the mirror according to the present invention is connected to the support loop at only one point, it might be expected to be more easily damaged than a conventional mirror by shock and vibration. This, however, was not found to be the case because in accordance with my invention, three parts of the casing are rigidly supported instead of only the top and the bottom. The mirror according to the present invention has therefore proved to be reliable and rugged in construction both under actual service conditions and in simulated vibration tests.

Furthermore, the improvement in the ease and greater angular degree of tilt adjustment made possible by the present invention has eliminated several installation problems experienced in prior mirrors of the general type described and in particular those applications in which the mirror must be placed relatively close to the driver. Under those conditions, the mirror must be tilted through a substantial arc in order to provide adequate visibility for drivers of different heights.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a perspective view of a mirror embodying the present invention as it appears when mounted upon a motor vehicle;

FIGURE 2 is a perspective view of a mirror and a modified form of supporting member according to the present invention;

FIGURE 3 is a vertical sectional view of the mirror according to the present invention;

FIGURE 4 is a vertical sectional view on line 4—4 of FIGURE 3;

FIGURE 5 is a horizontal sectional view taken on line 5—5 of FIGURE 3;

Figure 6:
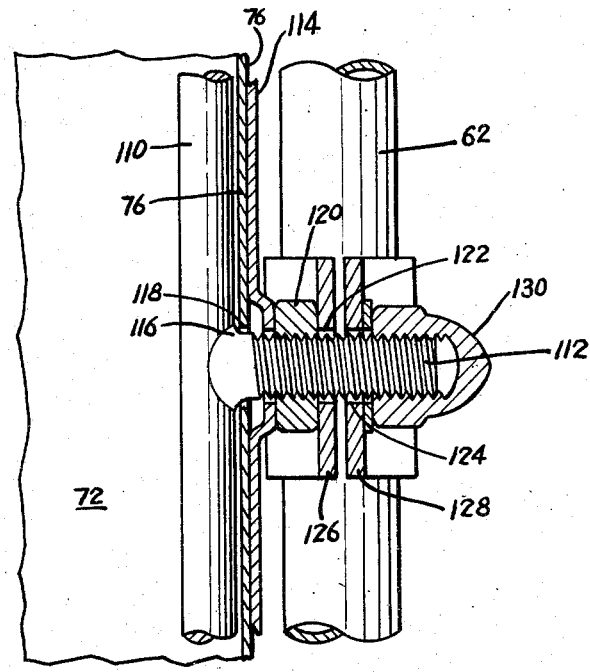
FIGURE 6 is a partial vertical sectional view illustrating the supporting pivot of the mirror housing as seen in line 6—6 of FIGURE 5.
Figures 7, 8:
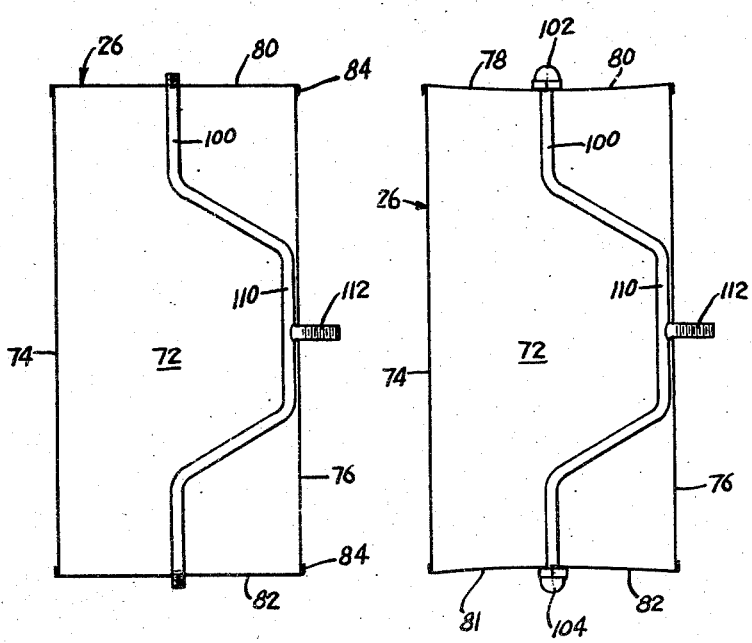
FIGURE 7 is a semidiagrammatic vertical sectional view of the mirror and mirror housing according to the present invention as it appears before the nuts are fastened to the end of the reinforcing member.
FIGURE 8 is a diagrammatic view similar to FIGURE 7 showing the casing after the nuts are secured to the ends of the reinforcing member.

With reference to FIGURE 1, there is shown a vehicle such as a walk-in van or truck 10 including a windshield 12, doors 14 and a hood 16. Secured to one side of truck 10 above the doors 14 by means of fastener 17 is the upper end of a generally L-shaped supporting tube in the form of a loop 18. The lower end of the loop 18 is secured to the side of the vehicle 10 by means of a suitable fastener 20. The loop 18 includes a horizontally disposed leg 22 at the upper end thereof and a vertically disposed leg 24 extending downwardly from the forward end of the horizontal leg 22 to the side of the vehicle 10. Upon the vertical leg 24 is mounted a mirror assembly indicated generally at 26. The mirror assembly 26 includes a mirror head 28 and a supporting bracket or sleeve 30 which will both be described in more detail hereinbelow.

Referring now to FIGURE 2 there is shown a modified form of mounting according to the present invention. In FIGURE 2, a vehicle such as a semitrailer tractor 32 has mounted on the door thereof by fasteners 34 upper and lower mounting plates 36 and 38. Extending laterally from each of plates 36 and 38 are identical brackets 40 and 42. Each of brackets 40 and 42 includes a horizontally disposed supporting plate 46 which is suitably bored at its center to receive a bolt 48. Positioned over each of the bolts 48 for pivotal movement upon the plates 46 about a vertical axis are the upper and lower ends 50 and 52 respectively of a supporting loop composed of a generally U-shaped tube 54. The upper and lower ends of the tube 54 are flattened at 56 and 58 and each is bored to receive one of the bolts 48. Nuts 60 are threaded over the ends of the bolts 48 to secure the ends of the loop 50 in place. The ends of each of the flattened portions 56 and 58 as well as the supporting plates 46 are provided with cooperating friction members such as radially extending grooves or score marks 59.

The loop 50 includes a vertically disposed center section 62 upon which is mounted a mirror head 26 in all respects similar to the mirror of FIGURE 1 and including a sleeve 30 which is slidably mounted for vertical movement of the tube 50. The sleeve 30 is divided into two pieces secured together by means of a dovetail connection shown clearly in FIGURE 2.

Refer now to FIGURES 3–8 which illustrate in more detail the mirror assembly 26. As clearly shown in FIGURES 3, 4 and 5, the mirror assembly 26 includes a casing 70 which is preferably formed from sheet metal or the like and includes a back wall 72 and side walls 74 and 76. Vertically disposed tabs 75 and 77 extend centrally from the forward end of the side walls 74 and 76. In each of the side walls 74 and 76 are a plurality of inwardly projecting retainer members such as vertically spaced and aligned indentations 79. Each of the indentations 79 is positioned the same distance from the tabs 75 and 77 so that a mirror 81 can be slid between the tabs 75 and 77 and the retainer members 79. As best shown in FIGURE 5, the periphery of the mirror glass 81 is covered with a suitable protective material such as a rubber tape 83 which is bonded to the mirror glass 81 by means of any suitable adhesive.

End members or caps 78 and 80 are placed over the top and bottom of the casing 70. The caps 78 and 80 are rectangular as seen in plan view and include vertically extending rims 84. The end caps 78 and 80 are provided with central outwardly displaced shoulders 88 and 90 respectively. The center of each of the displaced portions 88 and 90 is bored at 92 and 94 respectively.

Positioned within the housing 70 between the mirror glass 81 and the rear wall 72 is a reinforcing member such as a reinforcing rod 100 the ends of which are threaded and project through openings 92 and 94. Upon the ends of the rod 100 are threaded fasteners such as nuts 102 and 104 which as they are tightened draw the center of the caps 78 and 80 inwardly as shown diagrammatically in FIGURE 8. The retaining element is in this manner placed under tension so as to securely brace the entire housing 70 as well as end caps 78 and 80 thereby reducing the tendency for the mirror to become damaged by normal shock and vibration.

As best seen in FIGURE 3, the center section of the reinforcing member 100 is displaced laterally at 110 and extends vertically in abutting relationship with the side wall 76 of the casing at the center thereof. Extending laterally from the rod 100 is a pivot member such as a threaded rod 112 best seen in FIGURE 6. The rod 112 can be suitably affixed to the rod 110 by butt welding. Positioned adjacent the opposite side of the wall 76 from the top to the bottom of the displaced portion 110 is a bracing plate 114. The side wall 76 and the bracing plate 114 are bored at 116 and 118 respectively to provide an opening through which the pivot member 112 extends. Threaded over the pivot member 112 to force the brace member 114 and portion 110 against the wall 76 is a nut 120 (FIGURES 3 and 6). The outward end of the pivot member 112 projects through openings 122 and 124 in a pair of flanges 126 and 128 which extend radially from the sleeve 30. The member 112 is secured to these flanges by a releasable fastening means such as a nut 130 which when tightened also serves to force the sleeve 30 into tight contact with the tubular support member. The flanges 126 and 128 and nut 130 thus coact for releasably retaining the pivot member 112 and sleeve 30 in selected positions with respect to the support portion 62.

As can be readily seen by inspection of FIGURE 2, the mirror head 26 can be quickly and easily moved from a retracted position shown in solid lines in FIGURE 2, to an extended position shown in dotted lines outwardly of the loop 50 by pivoting the sleeve 30 about vertical portion 62 thereof. As this is done, the mirror head 26 must also be inverted by pivoting it about a horizontal axis extending through the center of the pin 112 in order to position the mirror such that the mirror glass 81 faces rearwardly. The ability to extend the mirror 26 in this manner has a decided advantage when an unusually large trailer or boat is mounted behind the vehicle 32.

After the mirror head 26 has thus been moved to its desired position, the nut 130 should be tightened to securely retain the sleeve 30 and the assembly 26 in the selected position and to prevent sleeve 30 from sliding downwardly on the support tube.

When the vehicle is to be driven by an operator who is either taller or shorter than average, the mirror 26 can be easily moved upon the vertical portion of either of the support loops 18 or 50 by loosening the nut 130 and sliding the sleeve 30 either upwardly or downwardly as shown by arrows in FIGURES 1 and 2. When it is necessary to tilt the mirror about a horizontal axis so as to bring the desired image in view, the operator of the vehicle need only extend his arm through the window and pivot the mirror head 26 about a horizontal axis extending through the pivot member 112.

Occasionally, the glass will be broken but when this does happen the mirror glass 81 can be quickly replaced simply by removing either of the nuts 102 or 104, caps 78 and 80 and sliding the miror 81 out of the casing 70. A new mirror can then be quickly reinserted. The cap 78 or 80 is then replaced and the nut 15 securely tightened against the center thereof.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A rear view mirror for a vehicle comprising in combination, a support tube affixed to said vehicle, said tube including a vertically disposed portion, a mirror head including a casing, a mirror glass mounted within said casing, a reinforcing member extending vertically through said casing between the upper and lower ends thereof for exerting an inward force upon the upper and lower ends of said casing, a portion of said reinforcing member extending to one side of said casing intermediate the top and bottom thereof, a first pivot member positioned in a horizontal plane and extending from said portion of said reinforcing member out of said casing, said first pivot being rigidly connected to said reinforcing member and a second pivot member mounted upon said support tube and connected to said first pivot member, said first pivot member being adapted to allow the casing to pivot about a horizontal axis and said second pivot member being adapted to allow the casing to pivot about a vertical axis upon said support tube.

2. The apparatus according to claim 1 wherein the second pivot member comprises a sleeve mounted for sliding and rotational movement upon said tube.

3. The apparatus according to claim 2 wherein releasable retaining means is provided for fastening the first and second pivot members in selected positions upon the support member.

4. A rear view mirror for a motor vehicle comprising in combination, a supporting member affixed rigidly to said vehicle, a mirror head mounted upon said supporting member, said mirror head comprising a hollow casing having back and side walls, and an elongated reinforcing member positioned within said casing, said elongated reinforcing member being displaced toward one side of said casing and extending in abutting relationship with a portion of the side wall thereof and having a pivot member rigidly connected to said reinforcing member extending out of said casing through said one side wall for connecting said casing to said supporting member, members adapted to be mounted upon the ends of said casing and fasteners for securing the ends of the reinforcing member to the member so as to place the members and the casing compression and the reinforcing member under tension.

References Cited by the Examiner

UNITED STATES PATENTS

| | | | |
|---|---|---|---|
| 1,392,481 | 10/21 | Colbert et al. | 88—98 |
| 1,622,486 | 3/27 | Bourdon | 248—279 |
| 2,526,306 | 10/50 | Van Gelder | 248—279 |
| 2,783,015 | 2/27 | Kampa | 248—279 |
| 2,827,255 | 3/58 | Kampa | 248—285 |
| 2,849,920 | 9/58 | Morgenstern | 88—98 |
| 2,851,926 | 9/58 | Beach | 88—98 |
| 2,969,715 | 1/61 | Mosby | 248—285 |

CLAUDE A. LE ROY, *Primary Examiner.*